United States Patent
Huh et al.

(10) Patent No.: US 12,448,607 B2
(45) Date of Patent: Oct. 21, 2025

(54) SYSTEMS AND METHODS FOR MULTILANE VASCULATURE

(71) Applicant: THE TRUSTEES OF THE UNIVERSITY OF PENNSYLVANIA, Philadelphia, PA (US)

(72) Inventors: Dongeun Huh, Villanova, PA (US); Andrei Georgescu, Philadelphia, PA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 902 days.

(21) Appl. No.: 17/041,110

(22) PCT Filed: Mar. 26, 2019

(86) PCT No.: PCT/US2019/024093
§ 371 (c)(1),
(2) Date: Sep. 24, 2020

(87) PCT Pub. No.: WO2019/191111
PCT Pub. Date: Oct. 3, 2019

(65) Prior Publication Data
US 2021/0108178 A1  Apr. 15, 2021

Related U.S. Application Data

(60) Provisional application No. 62/648,209, filed on Mar. 26, 2018.

(51) Int. Cl.
*C12N 5/071* (2010.01)
*A61L 27/36* (2006.01)
(Continued)

(52) U.S. Cl.
CPC ........ *C12N 5/0691* (2013.01); *A61L 27/3687* (2013.01); *A61L 27/507* (2013.01);
(Continued)

(58) Field of Classification Search
None
See application file for complete search history.

(56) References Cited

U.S. PATENT DOCUMENTS

| 5,770,417 A | 6/1998 | Vacanti et al. |
| 2004/0044403 A1 | 3/2004 | Bischoff et al. |

(Continued)

FOREIGN PATENT DOCUMENTS

| CN | 103477222 A | 12/2013 |
| CN | 105050616 A | 11/2015 |

(Continued)

OTHER PUBLICATIONS

International Search Report dated Jun. 24, 2019 in International Application No. PCT/US19/24093.
(Continued)

*Primary Examiner* — Christine H Matthews
(74) *Attorney, Agent, or Firm* — BakerHostetler

(57) ABSTRACT

Systems and methods for multilane vasculature and multi-organ vascular-vessel fluidic interfaces in in vitro models. The method includes embedding at least one tissue into a 3D structure, forming a vascular interface for nutrient perfusion into the tissue or tissues, tuning the vascular interface or interfaces together or separately to possess a property of a native biological target tissue or target environment by modifying a vessel attribute; and lining a fluidic interface channel, for providing a growth fluid in a physiologically recapitulating manner. The 3D structure includes a vasculogenic element for angiogenesis or vasculogenesis.

8 Claims, 18 Drawing Sheets

(51) Int. Cl.
*A61L 27/50* (2006.01)
*C12M 1/12* (2006.01)
*C12M 3/00* (2006.01)

(52) U.S. Cl.
CPC ............ *C12M 21/08* (2013.01); *C12M 25/14* (2013.01); *C12N 5/0677* (2013.01); *C12N 2500/02* (2013.01); *C12N 2501/165* (2013.01); *C12N 2513/00* (2013.01)

(56) References Cited

U.S. PATENT DOCUMENTS

| | | |
|---|---|---|
| 2011/0244567 A1 | 10/2011 | Jeon et al. |
| 2012/0209378 A1* | 8/2012 | Drasler ................ A61F 2/2475 623/2.17 |
| 2014/0057311 A1 | 2/2014 | Kamm et al. |
| 2015/0087004 A1 | 3/2015 | Chen et al. |
| 2017/0009194 A1 | 1/2017 | Golway et al. |
| 2017/0355940 A1 | 12/2017 | Neumann et al. |
| 2018/0030409 A1 | 2/2018 | Lewis et al. |
| 2018/0037870 A1 | 2/2018 | Cho et al. |
| 2019/0055294 A1 | 2/2019 | Weiner et al. |

FOREIGN PATENT DOCUMENTS

| | | |
|---|---|---|
| CN | 107427537 A | 12/2017 |
| CN | 107693846 A | 2/2018 |
| KR | 10-2012-0118444 A | 10/2012 |
| KR | 10-2016-0005279 A | 1/2016 |
| WO | 2009/126524 A2 | 10/2009 |
| WO | 2012/016711 A1 | 2/2012 |
| WO | 2013/085909 A1 | 6/2013 |
| WO | 2013/116729 A1 | 8/2013 |
| WO | 2017/039043 A1 | 3/2017 |

OTHER PUBLICATIONS

Bai-Song et al., "Neovascularization and tissue engineering" Chinese Tissue Engineering Research and Clinical Rehabilitation, Nov. 11, 2007, vol. 11, No. 45, pp. 142-146 (English Abstract Available).

Tourovskaia et al., "Tissue-engineered microenvironment systems for modeling human vasculature", Exp Biol Med (Maywood), vol. 239, No. 9, Sep. 2014, pp. 1264-1271.

* cited by examiner

SYSTEMS AND METHODS FOR MULTILANE VASCULATURE

CROSS-REFERENCE TO RELATED APPLICATIONS

This application is a U.S. National Stage Patent Application under 35 U.S.C. § 371 of International Application No. PCT/US2019/024093, filed on Mar. 26, 2019, which claims priority to U.S. Provisional Application Ser. No. 62/648,209, filed on Mar. 26, 2018, each of which are incorporated by reference herein in their entirety.

STATEMENT REGARDING FEDERALLY FUNDED RESEARCH

This invention was made with Government Support under Grant No. TR002198 awarded by the National Institutes of Health. The Government has certain rights in the invention.

BACKGROUND

Certain organ-on-chip devices can include a micro engineered biological cell-culture compartment in which tissue- and organ-level elements of human physiology can be recapitulated. The micro engineered biological cell-culture compartment can allow physiological in vitro modeling of functional biological units of that organ system (e.g. insulin-secreting islet units to mimic a pancreas, air-liquid interfaces to mimic oxygen transport in the lung). Such models can perform tests on live human tissue without requiring live human subjects.

However, certain organ-chip systems fail to create functional and/or realistic multi-organ networks and are unable to recapitulate complex, physiological responses and multi-organ interactions at the systemic level. In 2D models, a monolayer of endothelial cells grown on a petri dish represents a vascular lumen, but this approach can be limited due to an absence of other cells typically involved in vessel behavior (e.g., pericytes and smooth muscle cells). Certain organ-chip systems have diffusional constraints that limit the size of 3D tissues grown within hydrogels or other scaffolds because of insufficient perfusion efficiency. Larger tissues can require more efficient perfusion for the development, survival, regulation, and homeostasis of tissues. Certain tissues require microenvironmental cues from blood vessel tissue or vasculature to differentiate to a physiological state in vitro, or to perform biological functions.

Accordingly, there remains a need to create multi-organ networks and interfaces thereto with improved perfusion efficiency for the organ-on-chip devices for therapeutic applications and drug screening.

SUMMARY

The disclosed subject matter provides system and methods for producing multilane vasculatures, or perfusable vascular fluidic interfaces to, from, or between either single or multiple in vitro tissues, or to, from, or between multiple in vivo tissues within a human or animal living tissue.

In certain embodiments, a method for culturing a tissue using a microphysiological device or organ-on-a-chip device can include embedding at least two tissues into a 3D structure, where the 3D structure includes a vasculogenic element. A vascular interface for nutrient perfusion is formed into the at least two tissues, and is tuned to possess a property of a native biological target tissue or a target environment by modifying at least one vessel attribute. A fluidic interface channel can be lined and coupled to the 3D structure to provide a growth fluid thereto, in order to promote blood vessel production. A corresponding system is similarly disclosed herein.

In certain embodiments, a method for culturing a tissue using a microphysiological device or organ-on-a-chip device can include embedding one tissue type into a 3D structure and one or more vasculogenic elements. A vascular interface for nutrient perfusion is formed into the tissue, or out of the tissue, or into and out of the tissue, and is tuned to possess a property of a native biological target tissue or a target environment by modifying at least one vessel attribute. A fluidic interface channel can be lined and coupled to the 3D structure to provide a growth fluid thereto, in order to promote blood vessel production. A corresponding system is similarly disclosed herein.

In certain embodiments, the method can further include introducing a section, an element, or a layer of a vasculogenic tissue between the at least two tissues to create the vascular interface. The vasculogenic element and the layer of the vasculogenic tissue can include a hypoxia induced factor (HIF), a fibroblast growth factors (FGF), and/or a vascular endothelial growth factor (VEGF). In some embodiments, the method can further include linking a plurality of the vascular interfaces to form a multi-lane vasculature culture system.

In certain embodiments, the method can include introducing a section, an element, or a layer of a vasculogenic tissue upstream, or downstream, or upstream and downstream of one tissue to create one or more vascular interface to enable fluidic communication to the tissue through vascular vessel structures. The vasculogenic element and the layer of the vasculogenic tissue can include a hypoxia induced factor (HIF), a fibroblast growth factors (FGF), and/or a vascular endothelial growth factor (VEGF). In some embodiments, the method can further include linking a plurality of the vascular interfaces to form a multi-lane vasculature culture system.

In certain embodiments, vessel attributes of the vasculature can be tuned to possess a property of a native biological target tissue by modifying one or more of the following: a vessel density, a vessel diameter, a vessel barrier function, a vessel disease condition, or a material property (including stiffness, pore size, or exposed chemical moieties or chemical groups) that indirectly (e.g., through mechanosensory feedback to the vascular cells or vascular tissues) accomplishes one or a combination of these modifications.

BRIEF DESCRIPTION OF THE DRAWINGS

Further features and advantages of the present disclosure will become apparent from the following detailed description taken in conjunction with the accompanying figures showing illustrative embodiments of the present disclosure, in which.

Figure 1:
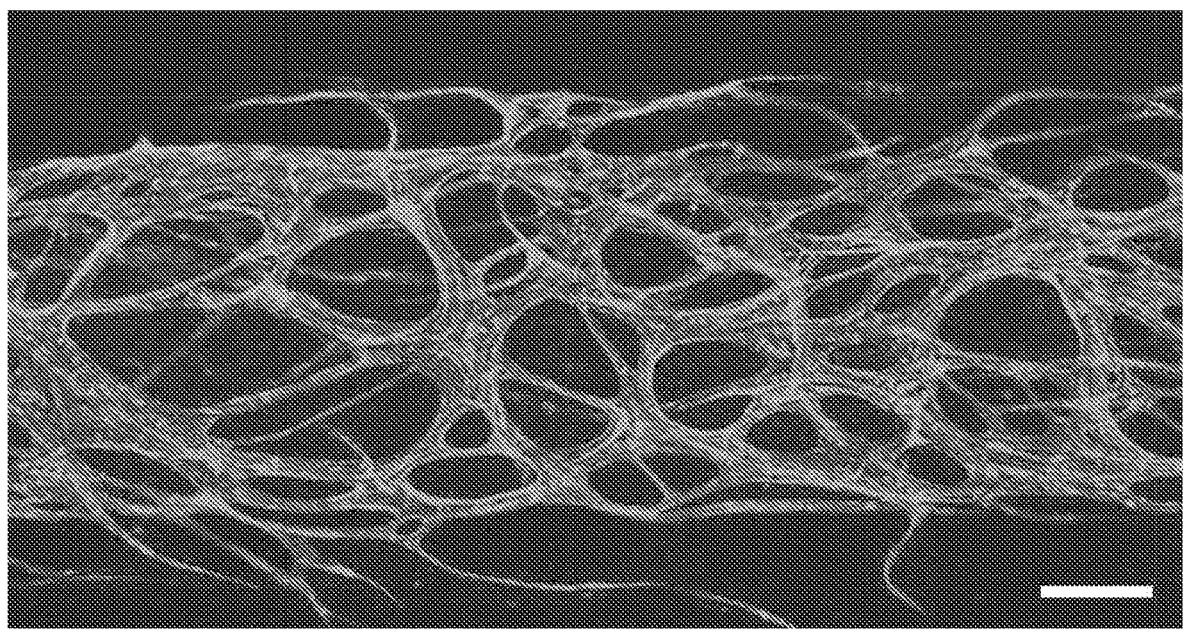
FIG. 1 is an illustration of an exemplary engineered vasculature in 3D fibrin hydrogel in a 3D micro physiological tissue culture device. Scalebar 200 µm.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments.

DETAILED DESCRIPTION

Techniques for producing a body organ or system on an organ-on-chip using a plurality of microfluidic devices are disclosed herein. The disclosed subject matter can perform a fully or partially automated organ culture using the organ-on-chip without the need for specialized personnel by modeling feed-forward and feedback effects from interfacing one functional unit to another in the organ-on-chip.

In certain embodiments, the disclosed subject matter provides a micro physiological tissue culture system. The micro physiological tissue culture system can include engineered vessel networks. For example, vascular endothelial cells, fibroblasts, pericytes, mesenchymal stem cells, and/or smooth muscle cells can be seeded together into a 3D ECM scaffold or hydrogel and supplied with endothelial cell media containing vasculogenic factors including VEGF, FGF, and endothelial growth hormones. As shown FIG. 1, 3D fibrin hydrogel, or collagen hydrogel, or biocompatible hydrogel, or a combination thereof can be used for vasculature engineering. In the presence of these growth factors, the cells can form patterned vessel structures with hollow, perfusable lumens through the process of vasculogenesis, angiogenesis, or a combination of vasculogenesis or angiogenesis.

Figure 2:
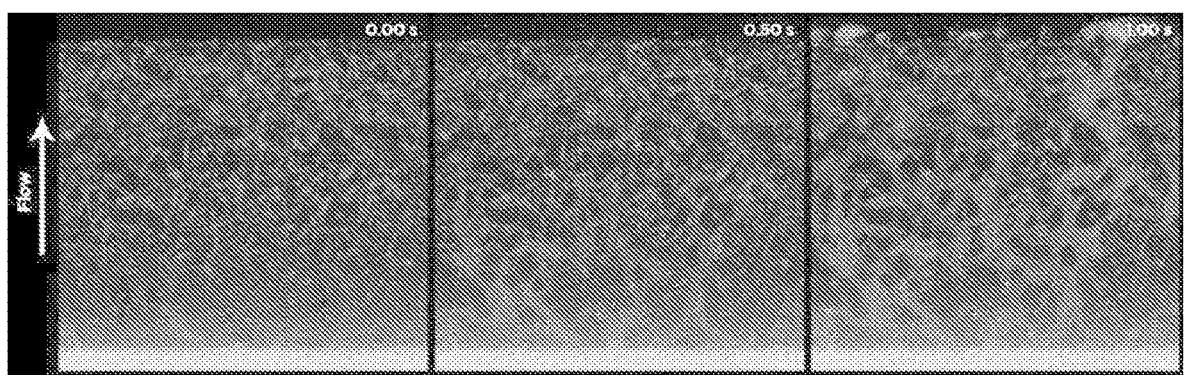
FIG. 2 is an illustration of an exemplary perfusion of 1 µm fluorescent beads (dots from bottom) through the hollow lumen of engineered vasculature (RFP-expressing vascular endothelial cells) in a micro physiological device.
Figure 10:
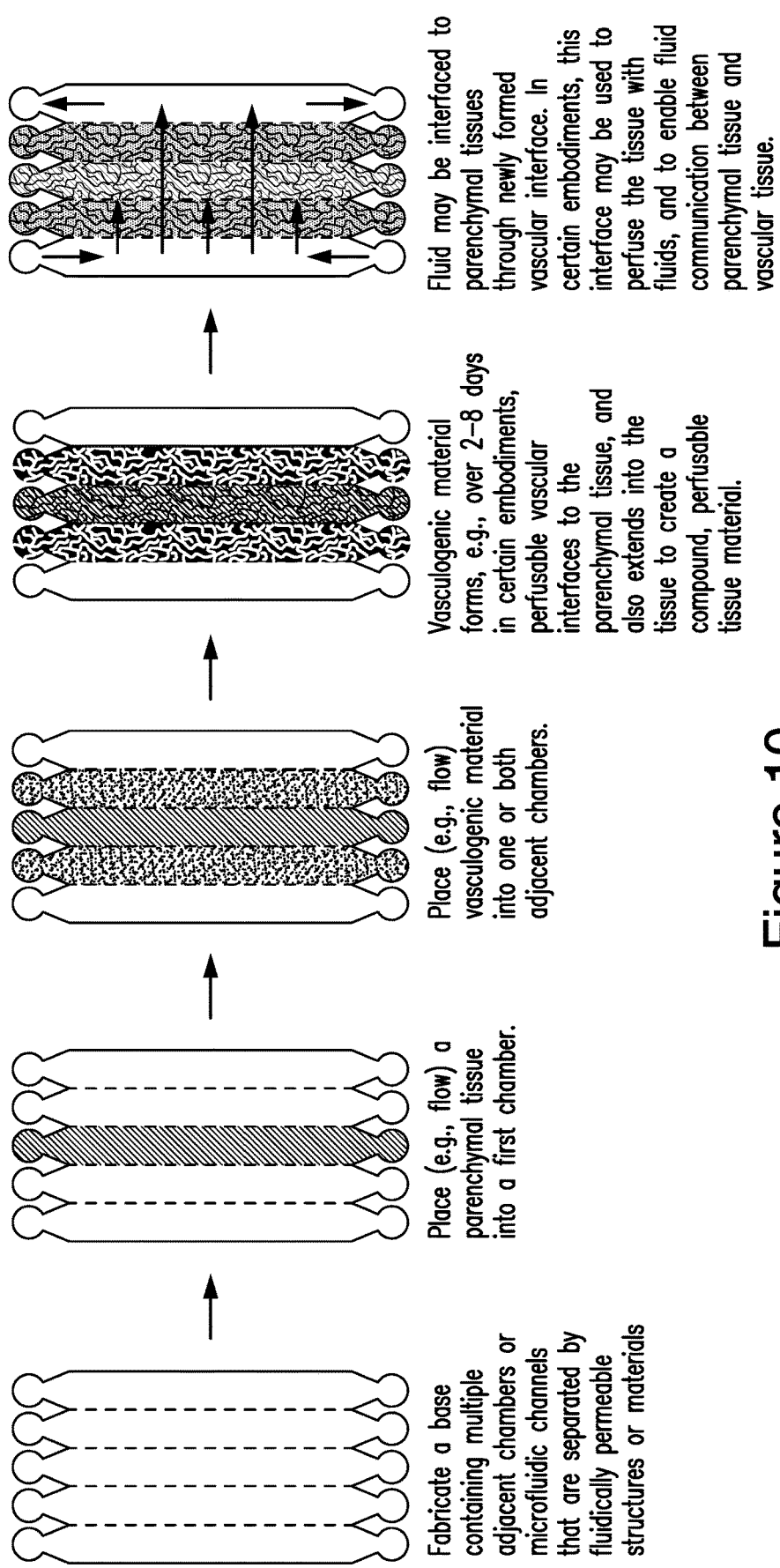
FIG. 10 is a diagram illustrating exemplary stages in a method in accordance with the disclosed matter: Tissues form continuous and perusable vascular connections between the flanking flow channels.

In certain embodiments, the micro physiological tissue culture system can include a line with a layer of endothelial cells on the walls of the vascular gel. For example, the monolayer line of endothelial cells can drive angiogenic sprouting into hydrogels. The micro physiological tissue culture system with the monolayer layer can anastomose the vessels forming within the 3D gel matrix to the external lumen of the gel's endothelial lining. In some embodiments, after 2-7 days of growth, the 3D micro physiological tissue culture system can have a perfusable vascular network of vessels including a hollow, endothelial cell-lined lumen surrounded by pericytes or fibroblasts or a combination thereof in the surrounding stroma (FIGS. 2 and 10).

In certain embodiments, the micro physiological tissue culture system can have vascular interfaces between multiple engineered or native tissue types. The micro physiological tissue culture system can be a 3D cell culture model recapitulating body-scale or organ-scale tissue dynamics by linking of two or more tissue types, including the vascular tissue produced in the vascular interfaces. Data gathered by microscopy, effluent sampling, integrated biosensing, or physical/structural measurements can be utilized to create a 3D micro physiological tissue culture system or a 3D cell culture system. The disclosed culture systems can be used for therapeutic applications, culture of human tissue biopsies (e.g., cancer biopsies, sampled microbial cultures and/or infections), or screening of drugs.

In certain embodiments, the 3D micro physiological microfluidic system can provide perfusion for the development, survival, regulation, and homeostasis of tissues by promoting blood vessels in the tissues. Blood can carry nutrients, oxygen, signaling hormones, various cell types including erythrocytes, platelets, leukocytes, and stem cells, as well as metabolic waste products and carbon dioxide. To perfuse human tissue, the 3D micro physiological microfluidic system can have a similar vascular system as the human body which can be branched from the large aorta leaving the heart (e.g., 20-30 mm diameter) through arteries (e.g., 0.1-10 mm diameter), arterioles (e.g., 0.01-0.1 mm diameter), and capillaries (e.g., 0.005-0.01 mm diameter), at which point diffusion and transport of bloodborne elements into and out of the surrounding tissue can occur. From the capillary networks, blood can circulate back through venules (0.008-0.1 mm diameter) and veins (0.1-15 mm diameter). Blood vessels can include an inner endothelium formed from endothelial cells, which are surrounded by innervated smooth muscle cells, vascular pericytes, and fibroblasts in connective tissue.

In certain embodiments, the 3D micro physiological microfluidic system can provide reciprocal signaling that can occur between biological tissues and the vessels that perfuse it. Localized hypoxia or nutrient deprivation in human tissue can cause the secretion of signaling molecules including hypoxia induced factors (HIFs), fibroblast growth factors (FGFs), and vascular endothelial growth factor (VEGF). The secretion of signaling molecules can promote vasculogenesis, the formation of blood vessels from precursor cells, and angiogenesis, the sprouting of vessels from existing endothelial tissue. For example, nascent vessels formed by vasculogenic endothelial cells can be implicated in tissue delineation and inductive signaling during embryonic development, in the densely vascularized islets from which insulin and other hormones that govern homeostasis are secreted. These islets exist in intimate contact with fenestrated capillaries and sample the glucose concentration of the blood therein, releasing insulin in response; to create an in vitro model of a pancreatic islet without including its vascular environment are shortsighted. Additionally, endothelial cells and smooth muscle cells can be the targets of damage due to drug-induced vascular injury, but the resulting lesions can be localized to specific structures, e.g. the branch points in coronary arteries.

In certain embodiments, the 3D micro physiological microfluidic system can include different vasculature structures. For example, the vasculature structures can include the endothelial cells lining blood vessels in the brain which can form tight junctions with one another to control the molecules permitted passage into the brain (i.e., blood-brain barrier) in human brain. Additionally, the 3D micro physiological microfluidic system can include vasculature structure whose walls contain smooth muscle cells, connective tissue, and thin micro vessels which are responsible for alveolar gas exchange in lung.

Figure 13:
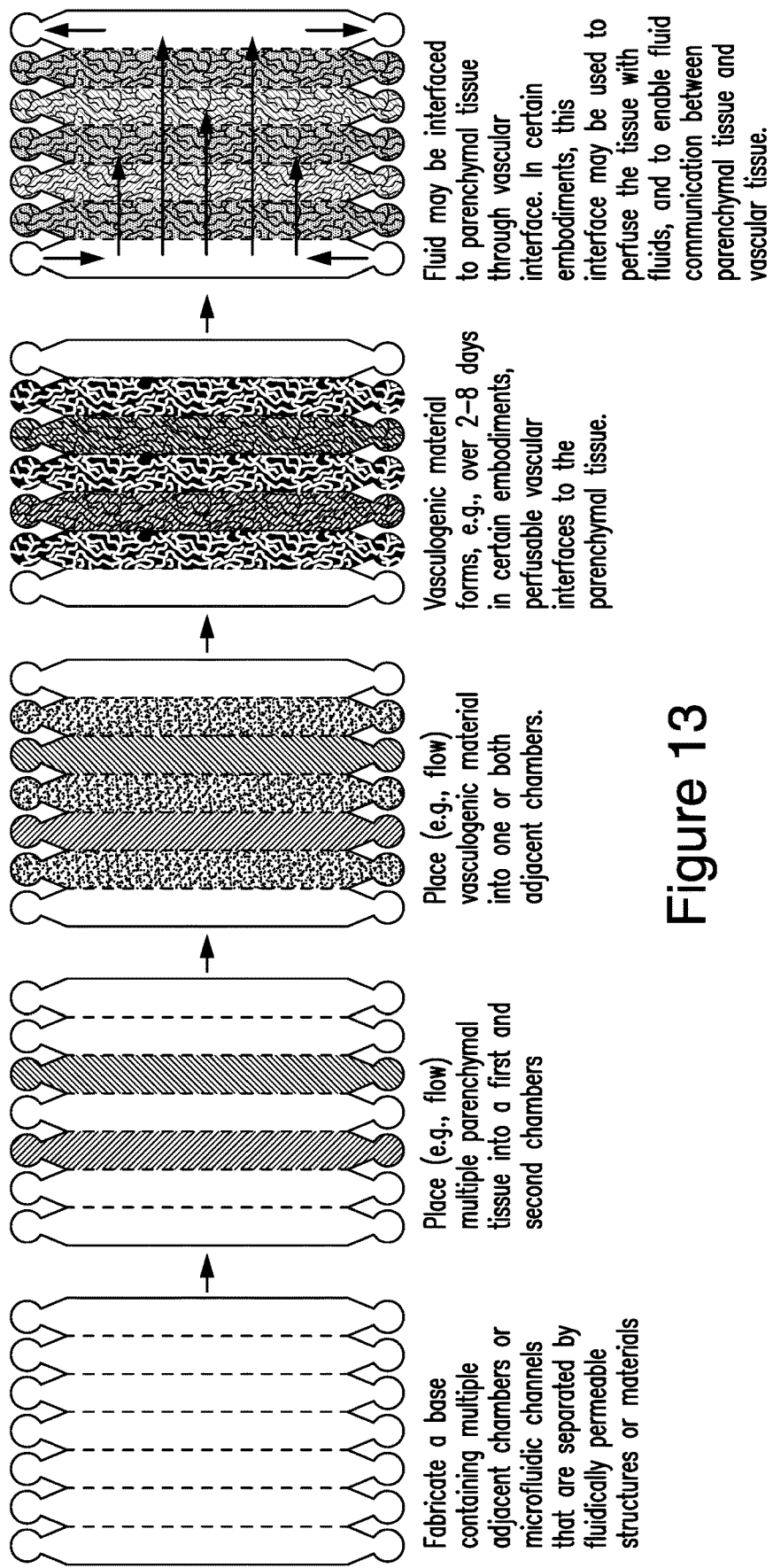
FIG. 13 is a diagram illustrating exemplary stages in a method in accordance with the disclosed matter: Multiple separate tissues are intra-vascularized by multiple placements of vascular interface material. This process expedites forming of perfusable multi-tissue networks simulating the biological connection in blood circulation.

In certain embodiments, the disclosed micro physiological microfluidic system can include at least one chamber. The shape of the chamber can be modified based on the purposes. For example, the chamber can be a straight lane. For example, the chamber can encapsulate another chamber in whole or in part. In some embodiments, the chamber can be patterned vertically. The chambers can be placed adjacent to each other. Furthermore, flow through these patterns can be networked in an adjustable manner. The chambers can be fabricated to create partition modeling of substances in the bloodstream. For example, tubing can be placed between any two or more ports accessing different areas of tissue of the device to create a direct connection. Fluid effluent flowing outwards through any of these ports can be collected. For example, one of the tissues can be placed in the center of the 5-lane embodiment and a flow with a drug candidate can flow from left to right through a tissue, through a first vascular interface on the left side and a second vascular interface on the right side. The outflow in the vascular ports before and after the tissue can be collected to measure the metabolism of the drug. As shown in FIG. 13, a leftward tissue with a rightward target organ can be interfaced with vasculature to sample the effluent before the leftward tissue, after the leftward tissue but before the target organ, and after the target organ; the metabolism of a drug and its effect on the secretory products of the target organ can be measured. The disclosed device can be expanded with more than two organs with vascular interconnections.

Figure 9:
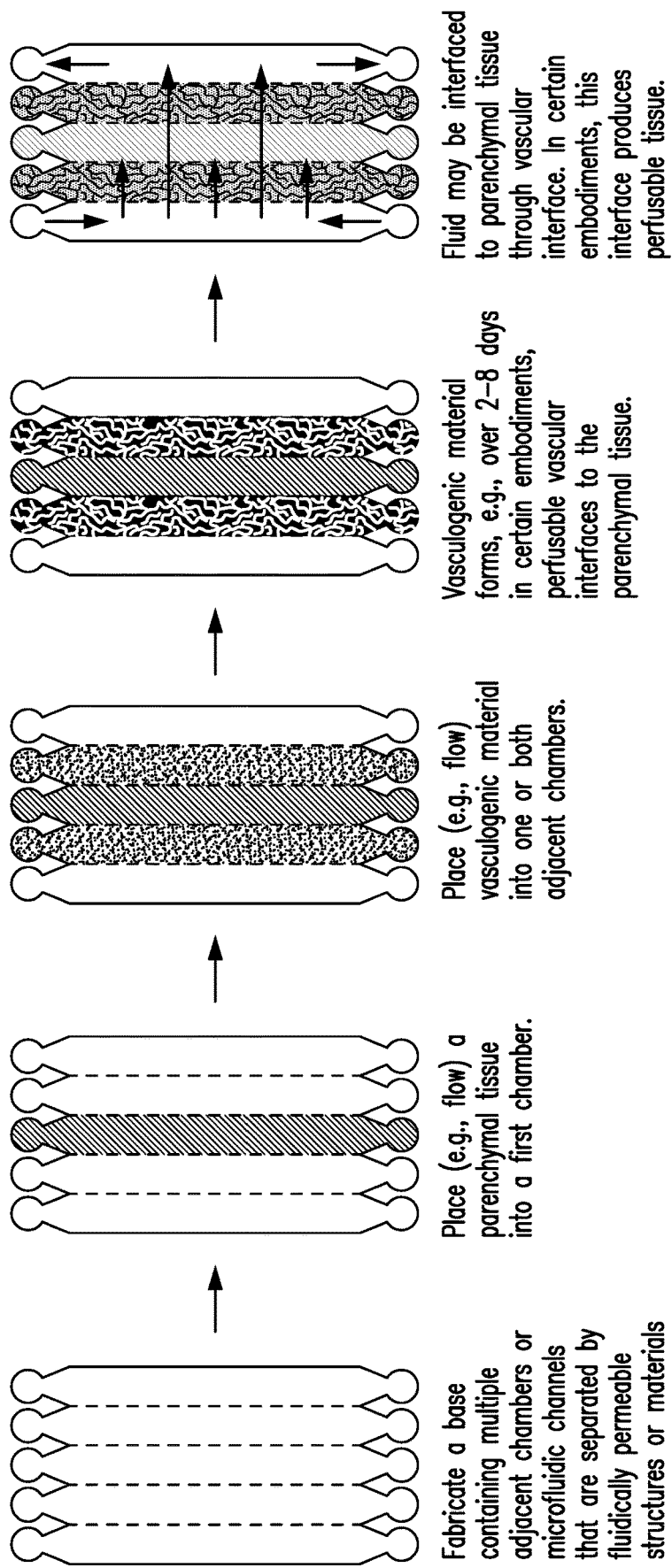
FIG. 9 is a diagram illustrating exemplary stages in a method in accordance with the disclosed matter.

In certain embodiments, the disclosed subject matter provides methods for generating 3D vascular interfaces. The method can include interfacing at least two parenchymal 3D tissues. The parenchymal tissues can possess vascular or avascular tissues. The tissues can be interfaced by introducing additional sections, elements, or layers of 3D vasculogenic tissue between them to form vessels. For example, as shown in FIG. 9, vascular interfaces can be created to a tissue disposed in a microfluidic device. The interfaced tissues can form perfusable vascular structures which are capable of vasculogenesis or angiogenesis. The interfaced tissue can self-vascularize via vasculogenesis and/or angiogenesis and anastomose or connect to existing vessels or vasculature in the parenchymal tissues, thereby forming an interface of perfusable fluidic connections between the opposite original tissues. In some embodiments, the interfaced tissue can vascularize or form new vessels in the existing tissues via angiogenic sprouting, thereby forming a perfusable vessel interface that fluidically links the existing parenchymal tissues (FIG. 10). In non-limiting embodiments, the interfaced tissue can anastomose with certain native vascular tissue or vascular vessels.

Figure 18:
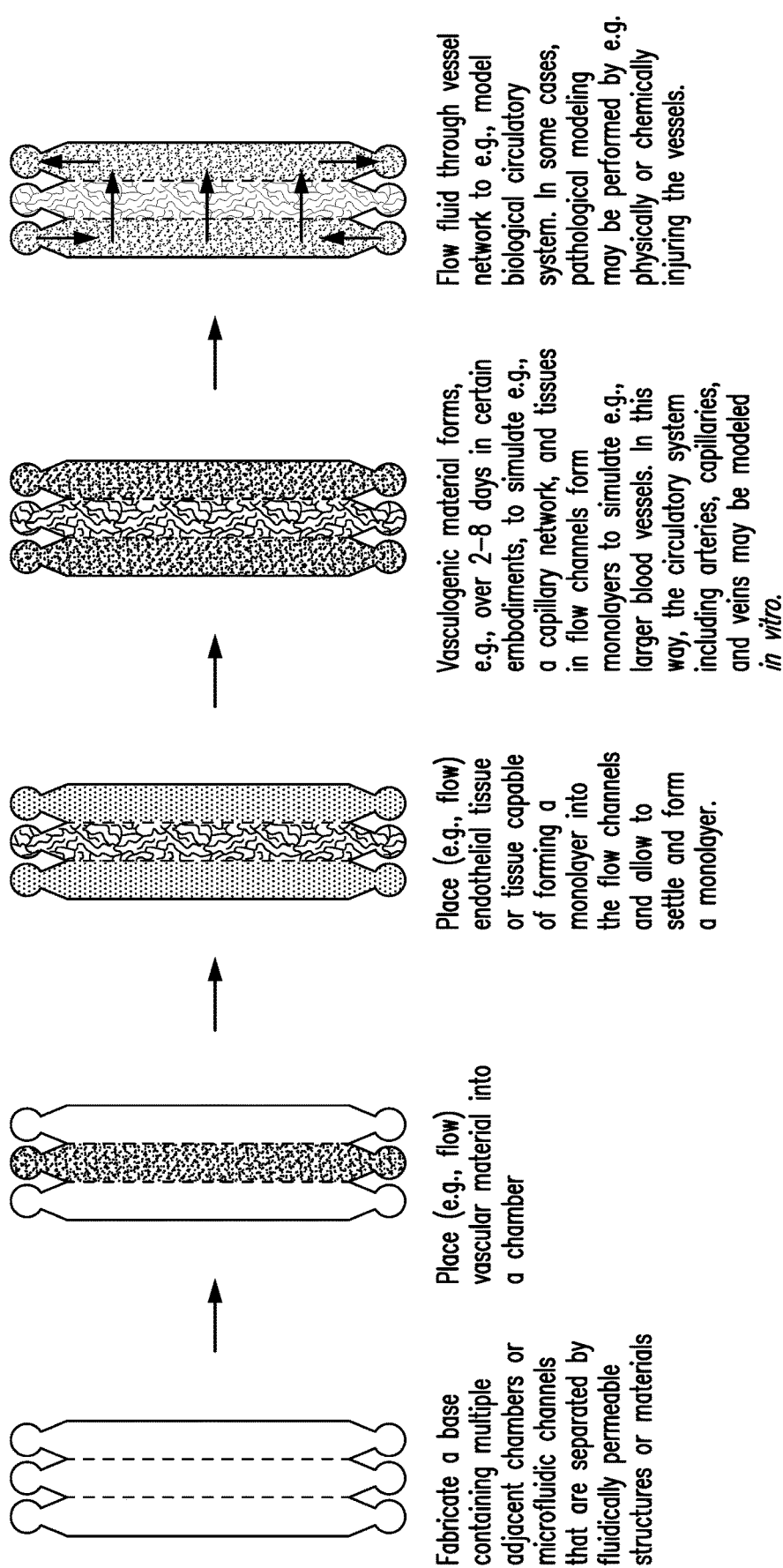
FIG. 18 is a diagram illustrating exemplary stages in a method in accordance with the disclosed matter: Discrete tissues are flowed into a channel and then vascularized. Tissues capable of forming a monolayer is embedded into flow channels.

In certain embodiments, the vasculogenic tissue can injected prior to the addition of adjacent target modeled 3D tissues. For example, as shown in FIG. 18, vasculogenic tissues can be interfaced in scaffold, matrix, or gel (in which the vascular interface is formed) to stabilize apposite tissue components that are subsequently injected or seeded into the tissue culture device. In some embodiments, the interfaced vasculogenic tissue can have a structural rigidity to pin in place (e.g. after the injection port is plugged) a fluid suspension of injected tissue or a tissue with loose or free-flowing elements. Therefore, the scaffold, matrix, or gel with the interfaced vasculogenic tissues can prevent loose elements from escaping into bulk solution by behaving as a filter with a pore size governed by the diameter of the vasculature or vessels. In some embodiment, the interfaced vasculogenic tissue can improve a structural rigidity of the gel to pin the injected tissue in place until its own hydrogel, scaffold, or extracellular matrix sets, cures, and/or cross-links. For example, injecting adipocytes in 3D collagen gel can create a "fat-on-a-chip" tissue model between two vasculogenic hydrogel extracellular matrix (ECM) scaffolds. The adjacent vasculogenic tissue can angiogenically sprouts into the fat model to create a vascular interface. In non-limiting embodiments, the vasculogenic tissue can further improve structural surfaces of the cured, set, or cross-linked 3D vasculogenic scaffold, matrix, or gel to seed or implant a monolayer of cells whose surface coverage is limited to the surfaces facing the volume enclosed by the vasculogenic tissue boundaries. For example, a monolayer of endothelial cells can be seeded into a gel chamber to mimic a much larger blood vessel, such as an artery, interfacing with 3D vasculogenic tissue that represents a capillary bed. The disclosed system can be used to determine the vessel scale at which drug-induced vascular injury takes effect.

Figure 16:
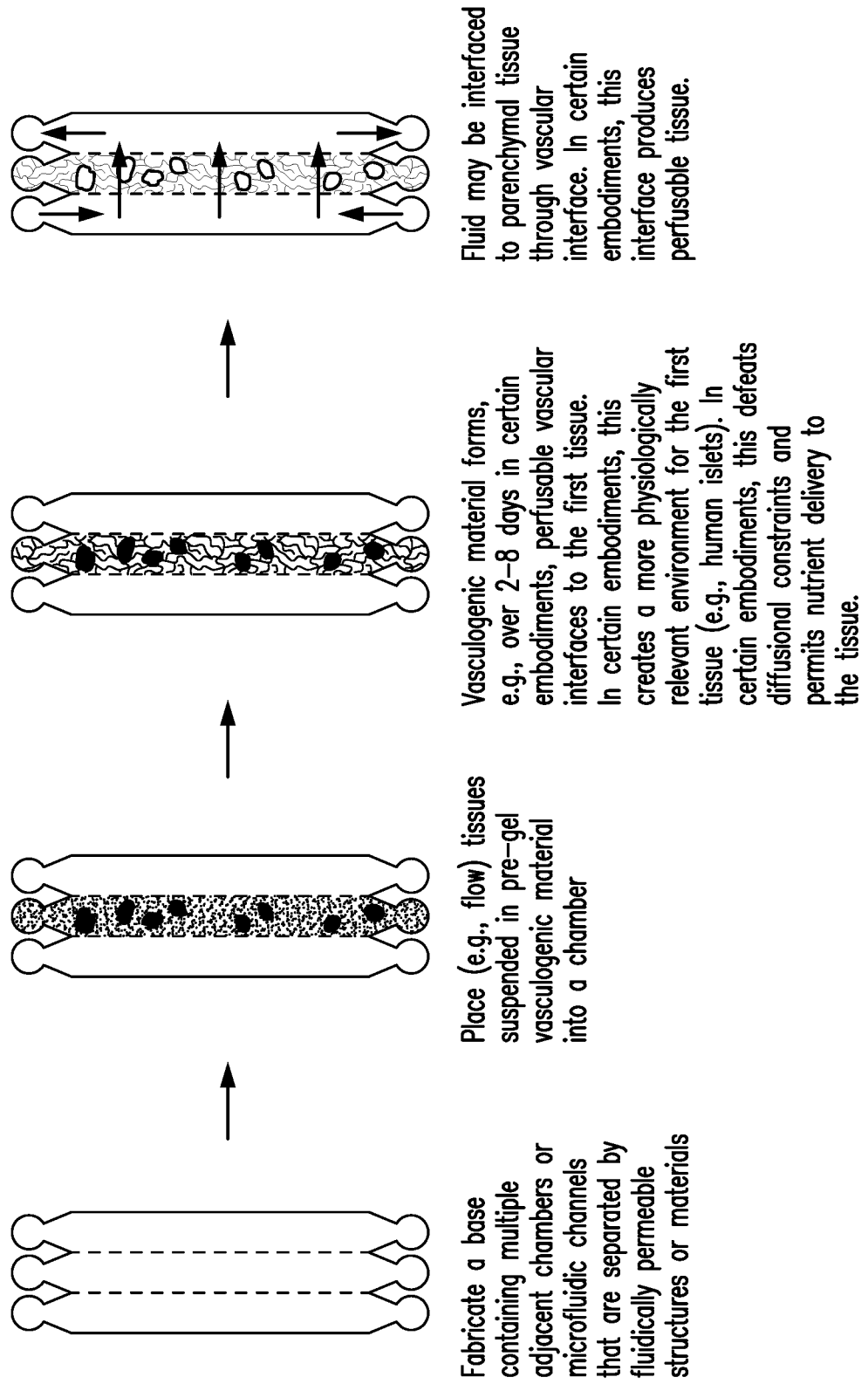
FIG. 16 is a diagram illustrating exemplary stages in a method in accordance with the disclosed matter: Discrete tissues are suspended in pre-gel vascular material and placed into a chamber. Vascular interface material forms interfaces with the encapsulated tissues.

In certain embodiments, the method can include embedding tissues within a scaffold, matrix, or gel that contains vasculogenic tissues. For example, engineered tissues (e.g., organoids or spheroids), native tissues e.g., (pancreatic beta islets, or biopsied cancer), or combination of thereof can be embedded within a scaffold, matrix, or gel. The tissue embedded-systems can have the vasculogenic elements which can form perfusable vessels that anastomose or connect to existing vessels or vasculature in the contained tissues. As shown in FIG. 16, discrete tissues (e.g., spheroids, organoids, biopsied tissue, biopsied tumors, encapsulated tissues, cell aggregates, or tissue scaffolds) can be suspended in pre-gel vascular material and placed into a chamber. The vascular interface material can form interfaces with the encapsulated tissues. In some embodiments, the vasculogenic elements in the scaffold, matrix, or gel form perfusable vessels that sprout angiogenically into the contained tissue in order to thereby forming a vascular interface. In non-limiting embodiments, engineered vessels in the scaffold, matrix, or gel can anastomose to existing vessels native to the embedded tissue, while also angiogenically sprouting additional vessels into the tissue to increase its vascularity.

In certain embodiments, the scaffold, matrix, or gel of the vasculogenic tissue interface can spatially restrain the interfaced tissue while still permitting fluidic access for nutrient perfusion. For example, the scaffold, matrix, or gel of the vasculogenic tissue interface can preventing the merging of multiple discrete tissues such as two pancreatic islets, or two kidney organoids, or multiple cancer spheroids. The scaffold, matrix, or gel of the vasculogenic tissue interface can further prevent the disassociation or loosening of the tissue elements (e.g. spheroids or organoids) into multiple parts or flattening in response to adhesion to a single 2D surface.

In certain embodiments, the method can include tuning engineered vasculature interfaces to possess properties relevant to the native biological target tissue. The tuning can be performed by modifying vessel attributes including the density of the engineered vascular network, the diameter of the engineered vessels, the barrier function of the engineered vessels (e.g. tight endothelial junctions or fenestrated junctions or sinusoidal endothelium), the health of the engineered vessels (e.g. for use in an in vitro disease model or vascular injury model), the time to perfusability of the vasculature (e.g. for quickly providing fluidic access for nutrient perfusion to an explanted tissue), and/or a combination thereof. In some embodiments, the tuned vascular interface can allow the interfaced tissue to differentiate to a physiological state, or behave in a physiologically relevant manner for purposes of biological investigation, therapeutic testing and/or screening. Furthermore. the tuned vascular interface can be used to determine or affect the partition coefficients of fluid flow into two or more adjacent tissues. For example, a tissue interface with vessels that are narrower can exhibit an increased resistance to flow than an interface with larger or denser vessels, thereby increasing fluid flow into the interface with larger vessels relative to the interface with more narrow, restrictive vessels.

In certain embodiments, environmental, mechanical and/or biological conditions can be tuned. For example, the environmental conditions can include the density of vasculogenic cells placed within the vasculogenic tissue which can modulate aspects including vascular density and the ratios of different cells or cell types within the vasculogenic tissue which can modulate aspects including vessel diameter. The biological conditions can include the biochemical profile supplied to the cells by growth medium, either consistently or dynamically. For example, the biological condition can be tune by modifying the concentrations of factors including VEGF to accelerate or halt vasculogenesis, Ang1 to promote angiogenesis, corticosteroids to promote tight junction formation, and/or TNF-alpha to increase vascular permeability. The mechanical conditions can include fluid environments and structural environments. For example, fluid environments can be modified to expose the tissue to continuous fluid perfusion to create tighter endothelial junctions and an efficient vascular network with less redundant branching. The structural environments can be modified to create a vasculogenic tissue interface within a stiffer ECM scaffold or gel in order to drive the formation of more rigid vessels, or a more compliant or softer scaffold or gel to mimic distended vessels, vessel aneurysm or rupture.

Figure 17:
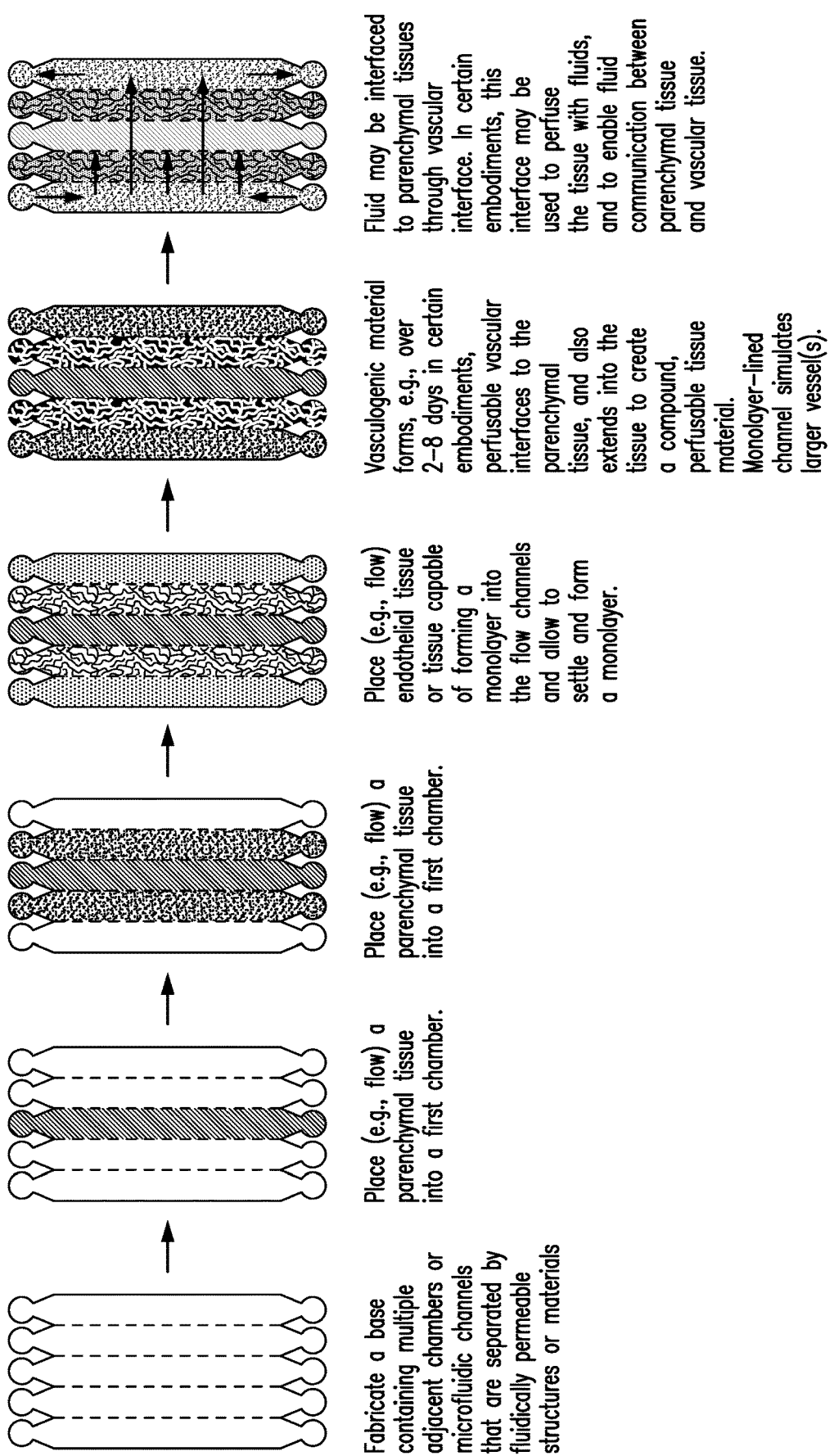
FIG. 17 is a diagram illustrating exemplary stages in a method in accordance with the disclosed matter: Increased area of vessel interfaces are created by lining a microchannel or fluidic chamber with a monolayer of cells.

In certain embodiments, the method can include lining a fluidic interface channel coupled to the tissues. The fluidic interface channel can include parallel, side-by-side, vertically stacked, or upstream/downstream spatial orientations or configurations. For example, as shown in FIGS. 17 and 18, increased area of vessel interface can be created by lining a microchannel or fluidic chamber with a monolayer of cells (e.g., endothelial cells). The micro physiological tissue culture system with vascular endothelial cells can imitate a vascular lumen and create an inter-tissue vascular interface. The inter-tissue vascular interface can have the diameter or cross-sectional area of the vessels which can be specifically defined by the geometry of the fluidic channel. The inter-tissue vascular interface can have patterned vessels. In some embodiments, the vessel walls can be mechanically actuated to simulate vascular constriction or dilation. For example, capsular constriction can be simulated without requiring the vessels to be innervated smooth muscle cells.

Figure 11:
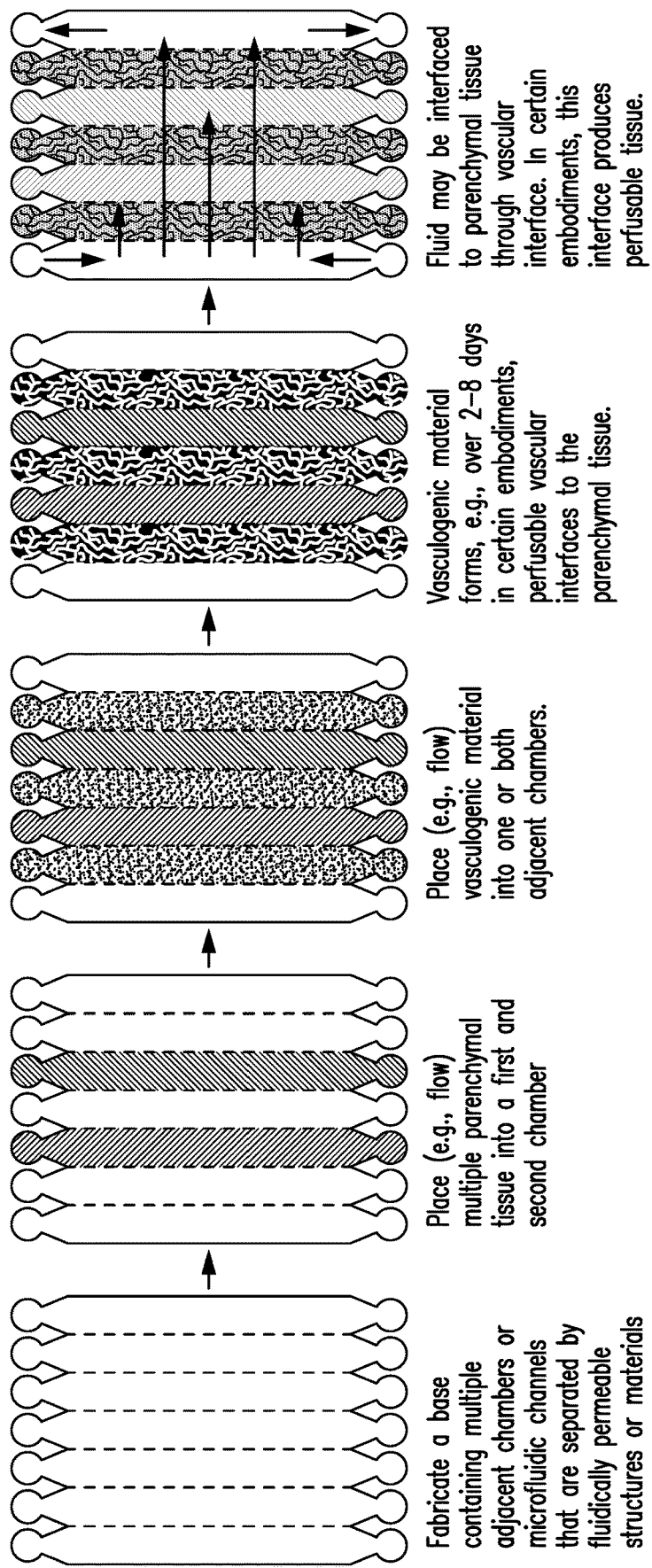
FIG. 11 is a diagram illustrating exemplary stages in a method in accordance with the disclosed matter: Multiple separate tissues are in fluid communication via multiple vascular interface materials disposed between the separate tissues.
Figure 12:
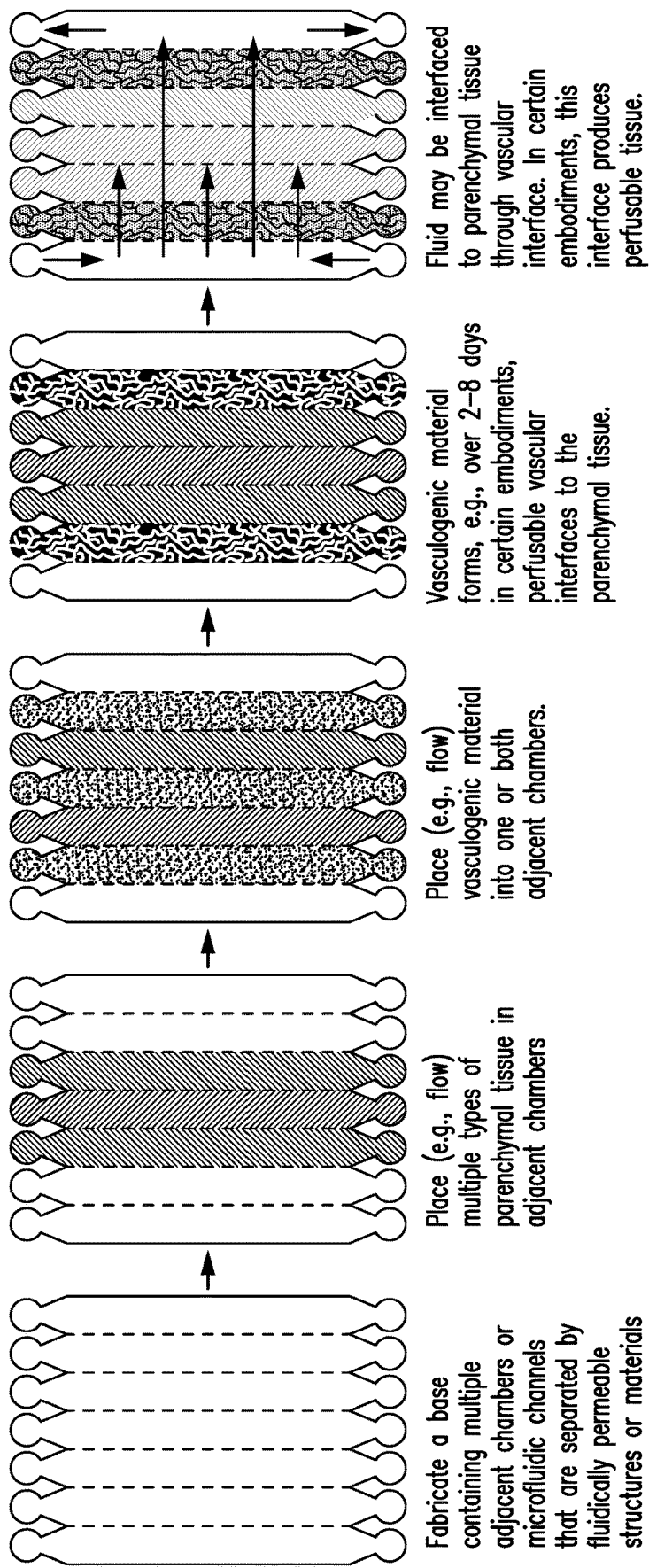
FIG. 12 is a diagram illustrating exemplary stages in a method in accordance with the disclosed matter: Multiple adjacent tissue types are interfaced to micro chambers of microfluidic channels by vascular interface materials to simulate a biological interface to the circulatory system.
Figure 14:
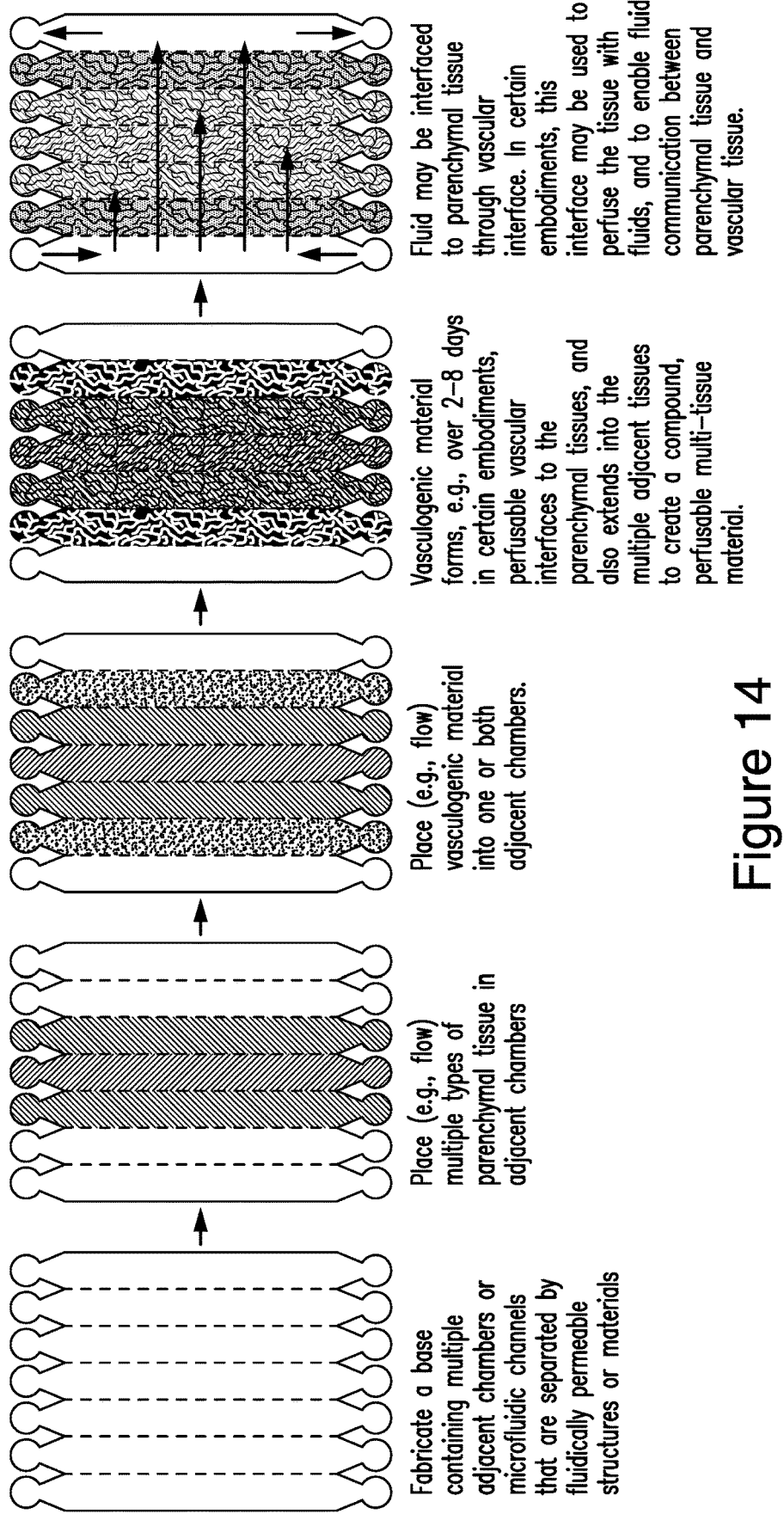
FIG. 14 is a diagram illustrating exemplary stages in a method in accordance with the disclosed matter: Multiple adjacent tissues are intra-vascularized by vascular interface material to form perfusable multi-tissue material.
Figure 15:
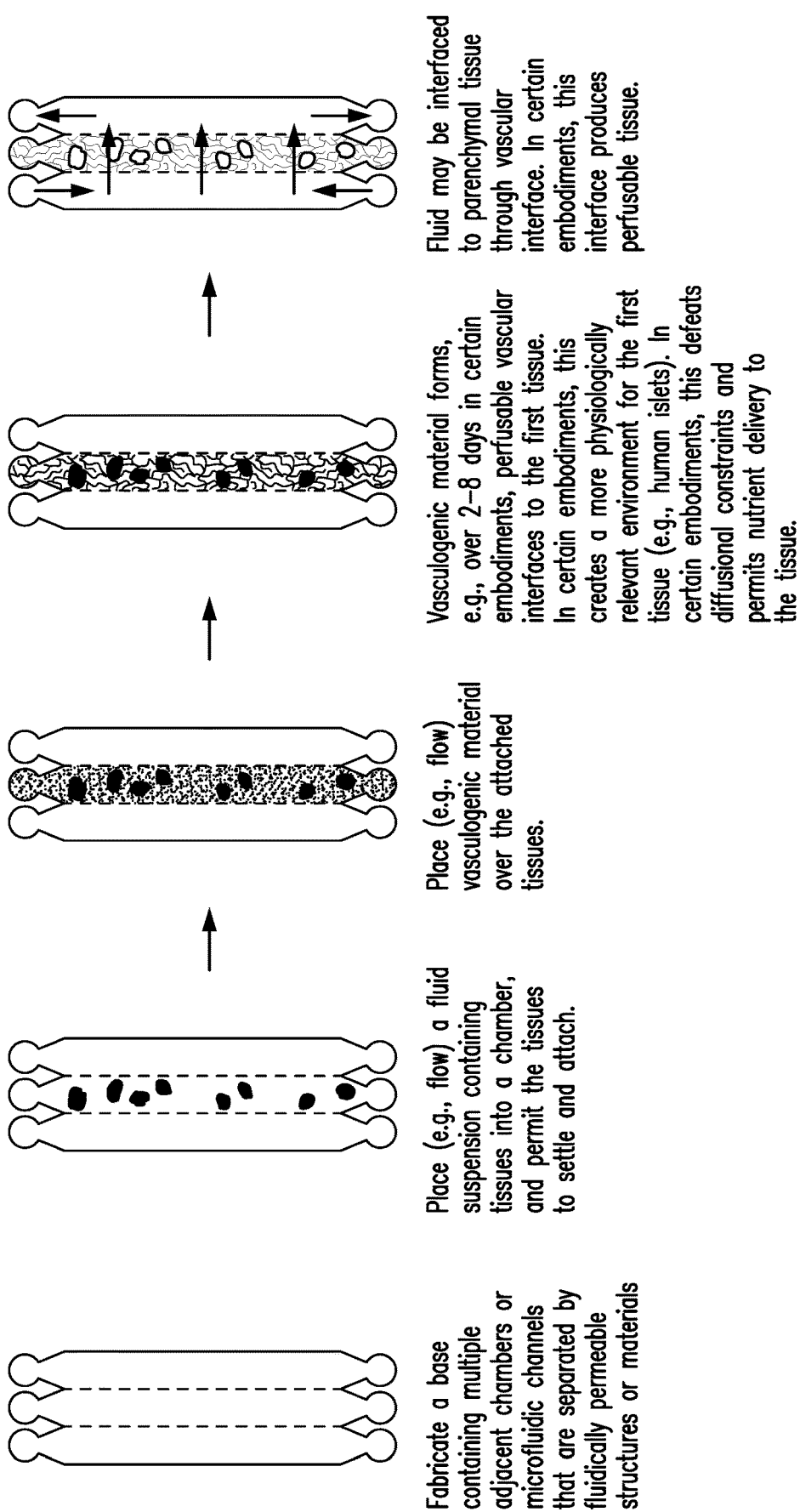
FIG. 15 is a diagram illustrating exemplary stages in a method in accordance with the disclosed matter: Discrete tissues are flowed into a channel and then vascularized.

In certain embodiments, the method can further include linking multiple vascular interfaced to form an "interface to an interface" structure. In the multiple-interface structure, fluids including growth media can be perfused through a sequence of vessels with different vascular properties (e.g. diameters, densities, junction tightness, matrix stiffness) that vary according to the native physiological properties of multiple tissues. For example, a large vessel with 500 μm diameter is formed to model an artery, which interfaces to an adjacent 3D vascular interface of arteriole-sized vessels with average diameters of 100 μm, which in turn interfaces to a micro vessel network with average diameters of 10-20 μm that is injected via pinning. The interfaced structure can further interface to a target parenchymal or organ tissue contained in the model or onto other vessel types to form a full circulatory model from large-scale to small-scale vessels. FIGS. 11 and 12 show multiple separate and adjacent tissues in fluid communication via multiple vascular interface materials. In some embodiments, fluids can be perfused to simulate the different scales of the circulatory system within an in vitro model as a sequential series of vascular interfaces to larger or smaller vessels. For example, the structure can include a series of 2D or 3D vascular interfaces, where one can interface to the next without parenchymal tissue. In non-limiting embodiments, as shown in FIGS. 13 and 14, multiple tissues can be intra-vascularized by multiple placements of vascular interface material and thereby form continuously perfusable multi-tissue material Example I: Multi-Tissue Vascular Interface (Pancreatic Islet Model)

A model of pancreatic islet was developed by utilizing the disclosed invention to create a vascular interface with explanted islets that recapitulates the densely vascularized environment of the human islet in vivo. The purposes of this model were to maintain the viability of explanted islets in vitro for an extended period, and to permit the interrogation of islet dynamics for purposes including assessment of glucose-stimulated insulin secretion, which is a measure of islet function.

Figure 3:
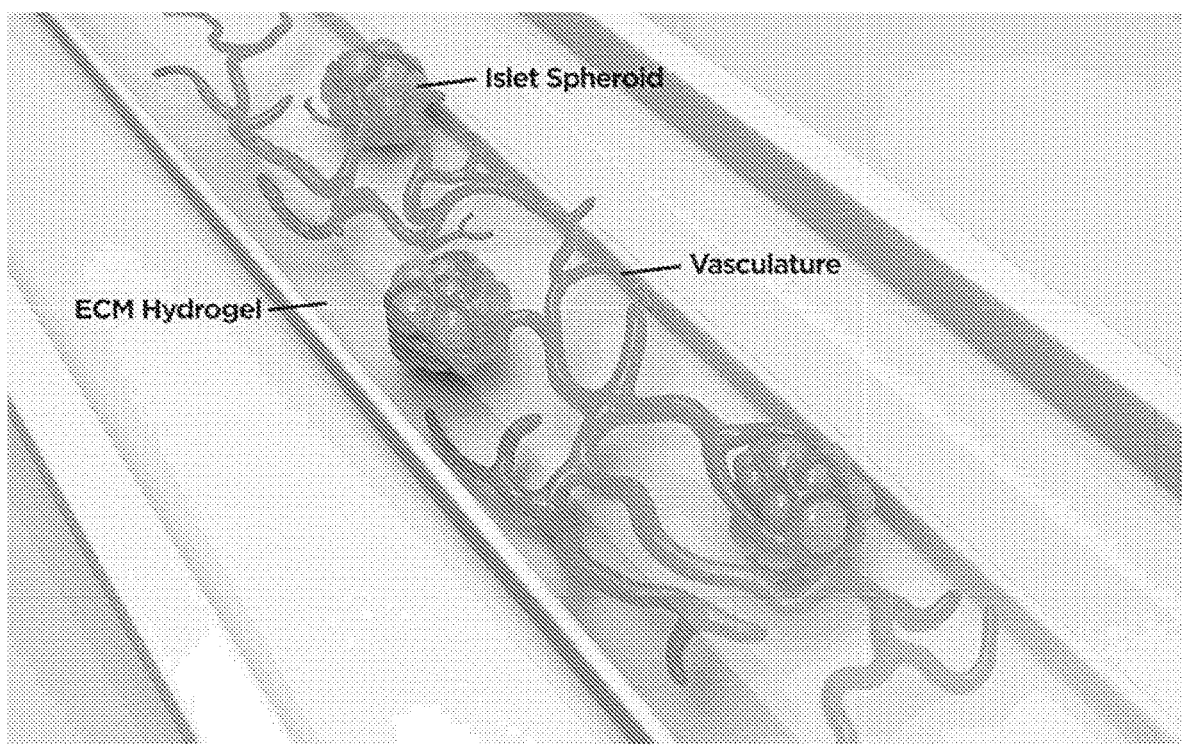
FIG. 3 is an illustration of an exemplary diagram of an engineered vascular interface to explanted human islet tissues in 3D ECM hydrogel within a micro physiological device.

To achieve these goals, as shown in FIG. 3, a rapidly formed, dense, and perfusable vascular interface was engineered from vasculogenic tissue including primary human vascular endothelial cells and fibroblasts. These vessels anastomosed to the native micro vessels of the primary human islets, and in doing so recapitulated the rich vasculature and resulting paracrine signaling between apposite endothelial and endocrine tissues native to islets in the human pancreas, which is essential to the function of islets in vivo—and is thus a promising method for sustaining islet function ex vivo in our micro physiological, 3D tissue culture devices.

Figure 4:
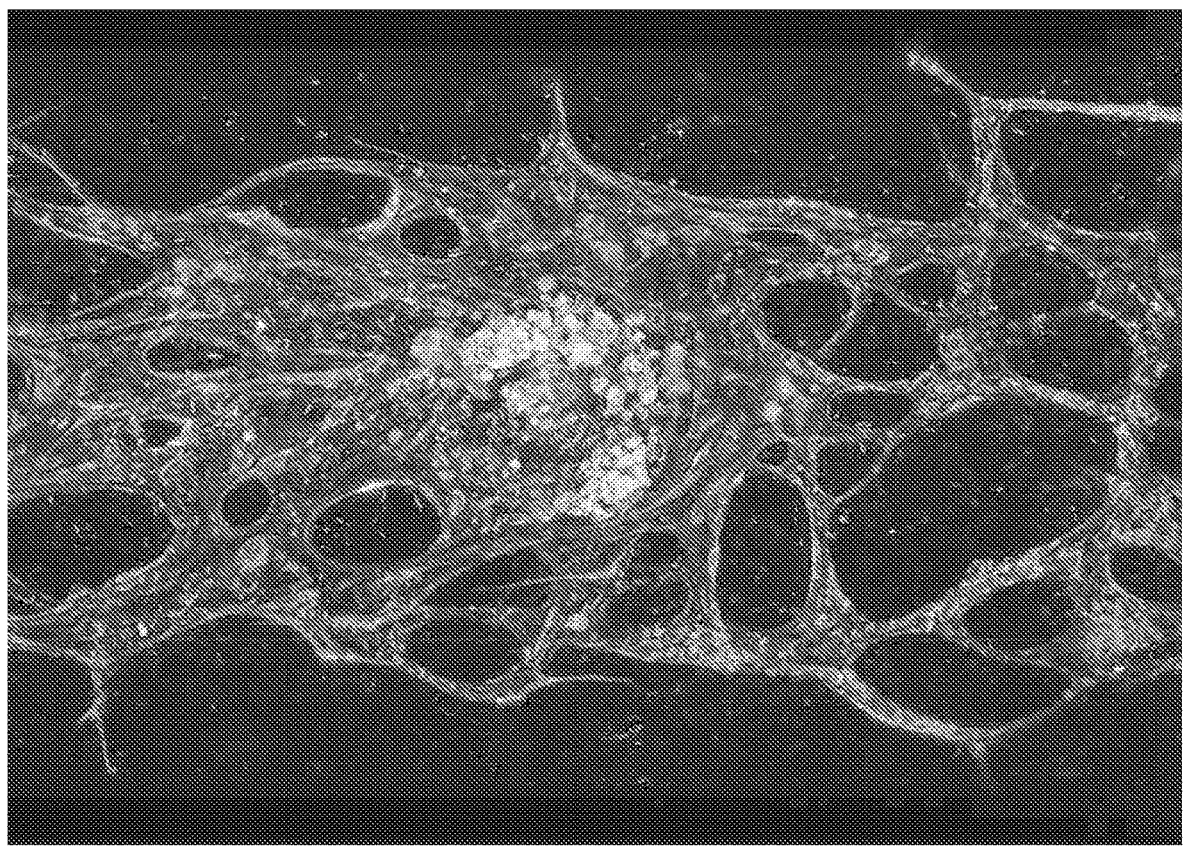
FIG. 4 is an illustration of an exemplary engineered 3D vascular interface of endothelial-lined vessels with a GFP-expressing pancreatic islet isolated from a mouse.

The engineered vascular interface permitted the function of the islet to be tested transiently, with high temporal resolution; by perfusing the engineered vascular interface, any hormonal secretions by the islet tissue—including insulin—enter directly into the perfusate and may be sampled in the device effluent, rather than remaining in the periphery of the islet tissue, or being diluted in a fluid suspension. Furthermore, as shown in FIG. 4, the engineered vascular interface was visualized by fluorescence imaging techniques.

Example II: Multi-Tissue Vascular Interface (Bone Marrow Model)

In this example, a model of leukocyte mobilization into the bloodstream was created by spatially patterning a section or layer of human bone marrow between two vascular interfaces. The leukocyte mobilization into the bloodstream can be caused in response to inflammatory cytokines released by infection elsewhere in the body. The spatial patterning of two 3D vascular interfaces in this model included room between them for the subsequent injection of human-derived whole bone marrow suspended in a 3D collagen and hyaluronic acid gel or ECM scaffold, which can be spatially pinned by the vascular interfaces. After injection, the vasculogenic tissue in the vascular interfaces angiogenically sprouted into the bone marrow tissue to vascularize it, and also anastomosed with native vasculature in the bone marrow tissue. A second perfusable vascular interface was created by patterning fluid access channels to form large vessel models and coating them with a monolayer of endothelial cells to form a vascular interface. The vascular interface was anastomosed to the 3D vascular interface previously formed to interface the bone marrow tissue.

Figure 5:
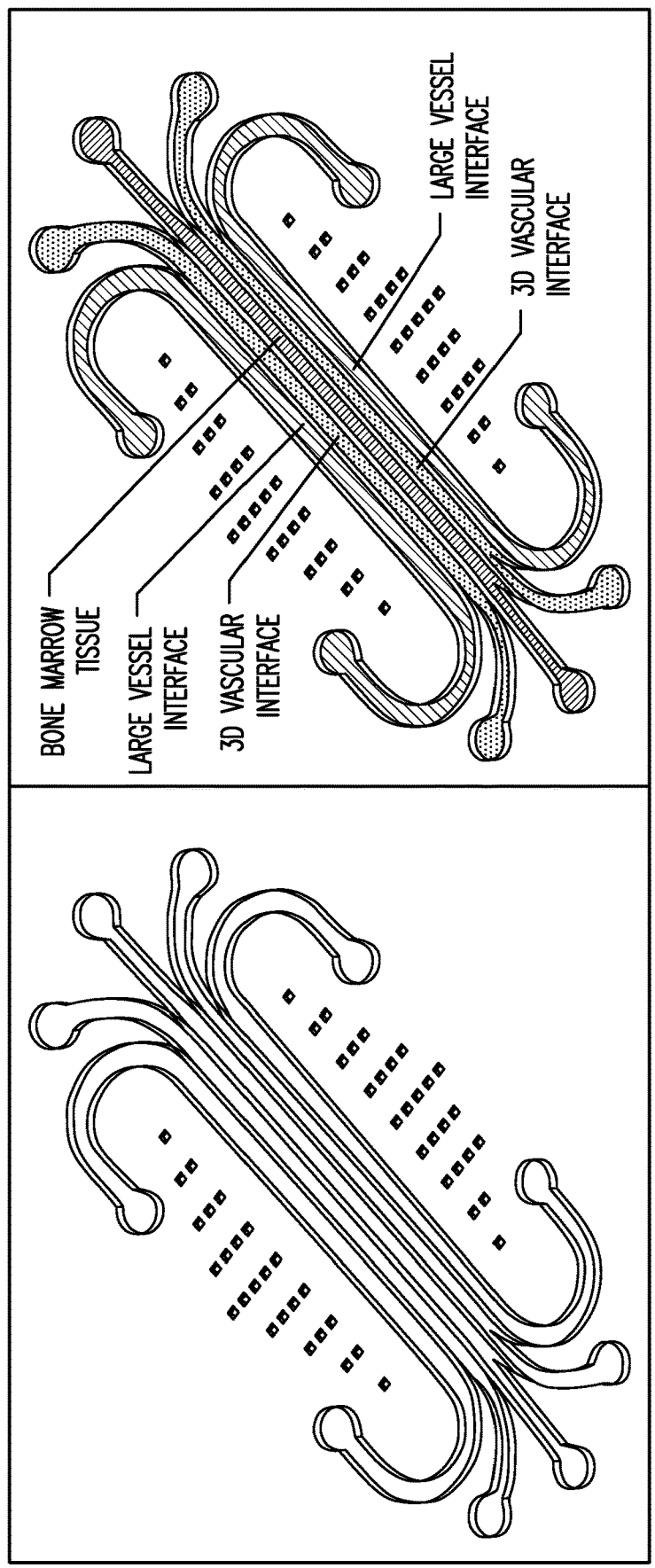
FIG. 5 is an illustration of an exemplary schematic diagram of a bone marrow model in which human bone marrow tissue is fluidically accessible via a 3D vascular interface, which is in turn interfaced to a large vessel fluid interface formed by coating all sides of a fluid channel with vascular endothelial cells to form a vascular vessel of defined size.
Figure 6:
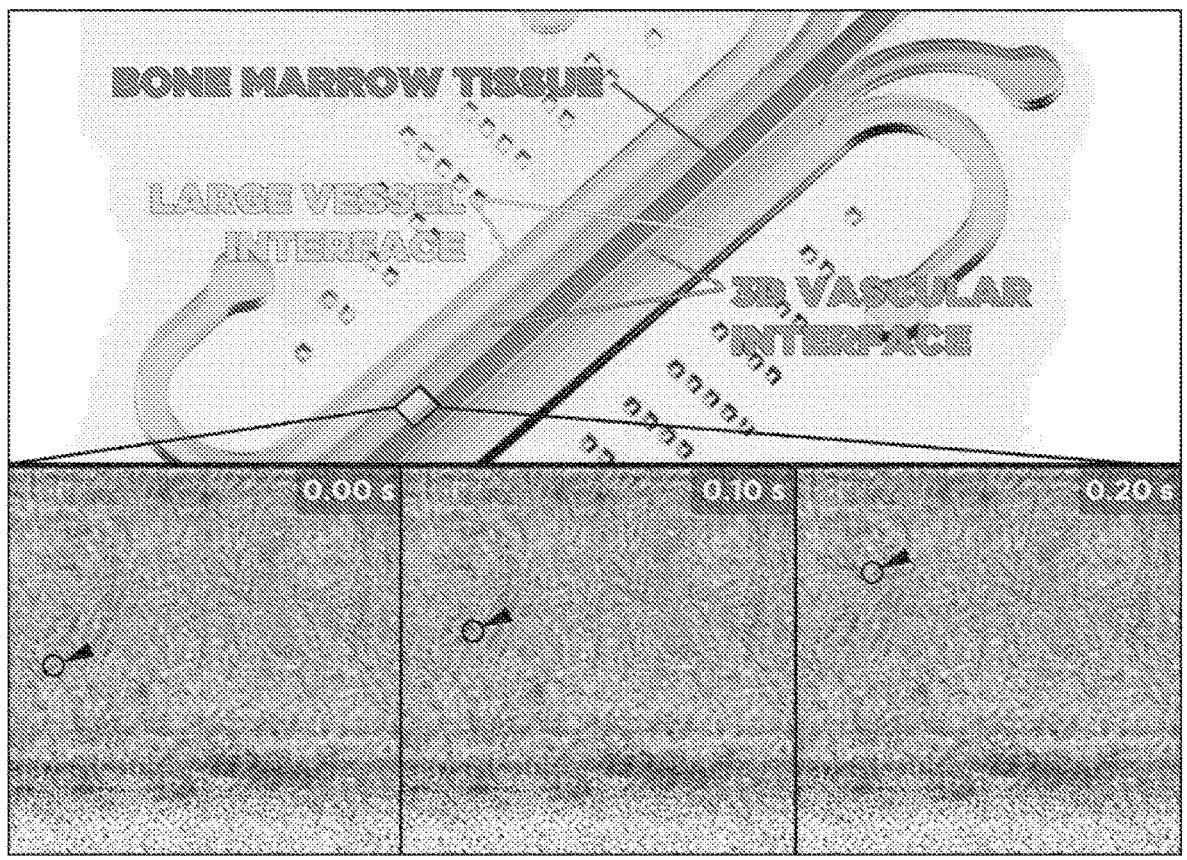
FIG. 6 is an illustration of an exemplary perfusion of leukocytes from a central bone marrow tissue compartment through an engineered 3D vascular fluidic interface as driven by fluid flow and size-based selectivity, which is governed by the lumen diameters of the vessels formed therein.
Figure 7:
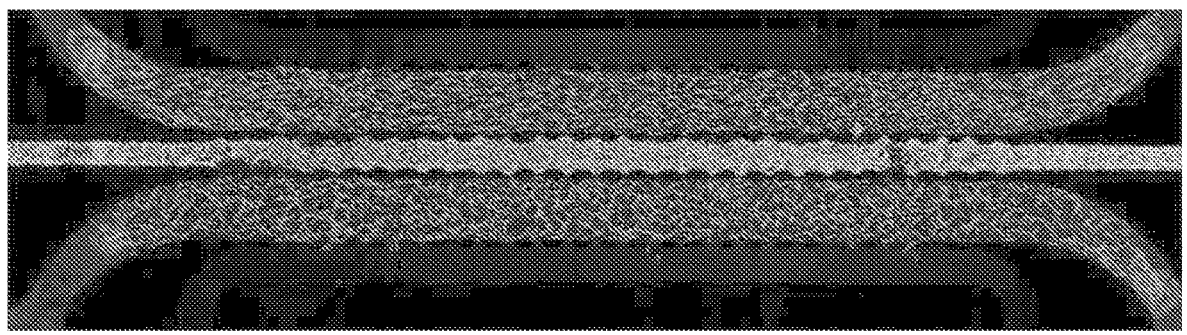
FIG. 7 is an illustration of an exemplary 3D vascular interfaces (endothelium) on inflow and outflow sides of trapped leukocytes in fluidic suspension (middle).
Figure 8:
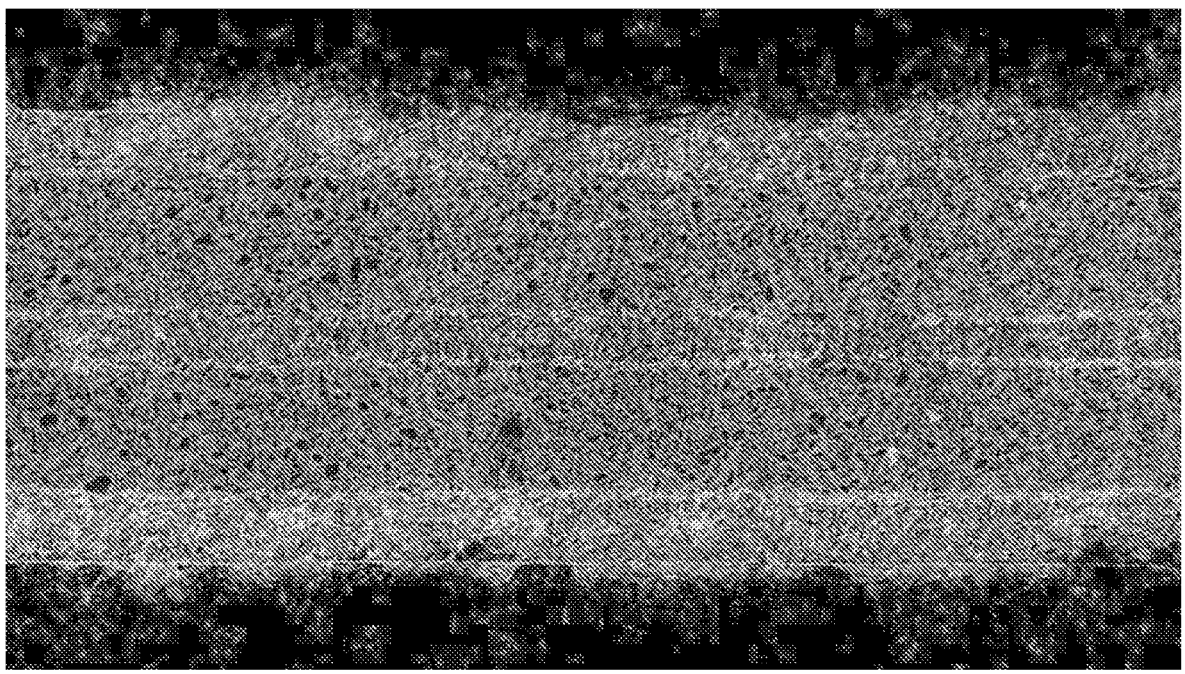
FIG. 8 is an illustration of an exemplary system with two 3D vascular interfaces in accordance with the disclosed matter.

As shown in FIG. 5, the created model utilized two 3D vascular interfaces to pin the subsequent injection of bone marrow tissue between them. The vascular interfaces self-vascularized and formed micro vessels that can selectively permit passage of leukocytes through their lumens while preventing the larger bulk bone marrow tissue from being displaced due to fluid flow. Furthermore, the outer patterned flow channels were seeded with a monolayer lumen of vascular endothelial cells, in order to create a large-vessel vascular interface that can interface to the smaller vessels in the 3D vascular interface. This chain of interfaces to bone marrow tissue permitted the modeling of leukocyte extravasation (i.e. movement into the vasculature) into bone marrow capillaries e.g. in response to inflammatory cytokine exposure, after which the leukocytes were transported to larger vessels to model their transport through the circulatory system towards inflamed tissue. As shown in FIG. 6, perfusion of leukocytes from a central bone marrow tissue compartment through an engineered 3D vascular fluidic interface was detected. The perfusion was selectively controlled by the lumen diameters of the vessels formed therein. FIG. 7 shows 3D vascular interfaces with endothelium on inflow and outflow sides of trapped leukocytes in fluidic suspension (middle). FIG. 8 shows an alternative utilization of the device used to create a bone marrow model. In this experiment, two dense 3D vascular interfaces were seeded into patterned lanes, between which and on the outside of which monolayers of vascular endothelial cells were seeded to create additional layers of vascular interfaces. On the outside lanes (topmost and bottommost), these monolayer vascular interfaces modeled large vessels (arteries and veins). On the inner lane, the monolayer vessel interface angiogenically spouted into the 3D vascular interface, which allows the formation of larger, more robust connections to the lumen of vessels in the 3D vascular interface. Following the establishment of these connections, bone marrow tissue was seeded into the central channel, into which angiogenic sprouts from the monolayer can be formed to create a perfusable vascular interface. The perfusable vascular interface spanned from the top channel of the model to the bottom.

It will be understood that the foregoing is only illustrative of the principles of the present disclosure, and that various modifications can be made by those skilled in the art without departing from the scope and spirit of the present disclosure.

What is claimed is:

1. A method for culturing a tissue using a microphysiological device, comprising:
   embedding a hydrogel into a central channel of the microphysiological device, thereby forming a three-dimensional structure within the central channel;
   seeding vascular cells within a first channel adjacent the central channel and onto a first wall of the three-dimensional structure formed within the central channel, wherein the vascular cells seeded within the first channel form a first vascular interface between the three-dimensional structure and the first channel that permits perfusion between the first channel and the three-dimensional structure;
   seeding vascular cells within a second channel adjacent the central channel and onto a second wall of the three-dimensional structure formed within the central channel, wherein the vascular cells seeded within the second channel form a second vascular interface between the three-dimensional structure and the second channel that permits perfusion between the second channel and the three-dimensional structure; and
   perfusing culture medium laterally through the microphysiological device from the first channel to the second channel via the central channel, the central channel being arranged between the first channel and the second channel,
   wherein the perfused culture medium is provided via the first channel and is removed via the second channel.

2. The method of claim 1, further comprising
   supplementing the culture medium with a hypoxia-inducible factor (HIF), a fibroblast growth factor (FGF), and/or a vascular endothelial growth factor (VEGF).

3. The method of claim 1, further comprising tuning one or more of the first vascular interface and the second vascular interface by
   modifying a seeding density of the vascular cells;
   modifying a diameter of a respective channel;
   modifying a barrier function of each vascular interface;

modifying a physiological condition of each vascular interface; and/or modifying a perfusability of each vascular interface.

4. The method of claim 1, wherein the hydrogel embedded into the central channel of the microphysiological device comprises one or more of cells, tissues, and cellular scaffolds.

5. The method of claim 1, wherein the vascular cells seeded within one or more of the first channel and the second channel are embedded within a scaffold, a matrix, or a gel.

6. The method of claim 3, wherein modifying the physiological condition of each vascular interface comprises exposing each vascular interface to tumor necrosis factor alpha.

7. The method of claim 3, wherein modifying the physiological condition of each vascular interface comprises adjusting a fluid flow rate of the culture medium provided to the first channel to control perfusion through the microphysiological device.

8. The method of claim 1, wherein the vascular cells seeded within the first channel and the second channel form respective vessels, and wherein the method further comprises actuating walls of the respective vessels of the first channel and the second channel to stimulate vascular constriction or dilation.

* * * * *